Patented Aug. 22, 1950

2,519,903

UNITED STATES PATENT OFFICE 2,519,903

REMOVAL OF THE SODIUM SALT OF LIGNOCERIC ACID AND OTHER MATERIALS FROM A TALL OIL SOAP

Torsten Hasselstrom, New York, N. Y., assignor to U. S. Industrial Chemicals, Inc., New York, N. Y., a corporation of Delaware No Drawing. Application July 17, 1947, Serial No. 761,732

8 Claims. (Cl. 260—97.7)

This invention relates to a method for the removal of the sodium salt of lignoceric acid and deleterious constituents from an aqueous solution of a tall oil soap containing the same.

Tall oil soap (skimmings) is obtained in quantity in the manufacture of pine wood pulp by the sulfate process, and is composed primarily of an aqueous solution of the sodium salts of various fatty and resin acids, together with a minor but appreciable proportion of non-saponifiables, the sodium salt of lignoceric acid and color bodies. For the tall oil released upon the acidification of such a tall oil soap to be of the greatest utility in the manufacture of esters, alkyd resins, etc., it is necessary, among other things, that the tall oil be substantially free from the aforementioned color bodies. Many processes have been suggested for the refining of tall oil as such (e. g., distillation, contacting with an adsorbent or mineral acids, etc.), but such processes are not completely satisfactory since in them a tall oil containing appreciable amounts of color bodies and the sodium salt of lignoceric acid is treated. For example, when a tall oil containing color bodies and lignoceric acid is subjected to vacuum distillation, the distillate nevertheless contains color bodies, and the valuable lignoceric acid is retained in the still residue (tall oil pitch) which generally is used as a fuel or is discarded.

The foregoing being briefly the state of the art, it is therefore an object of this invention to provide a method for the refining of an aqueous tall oil soap containing color bodies and the sodium salt of lignoceric acid in order to effect a removal of such materials, so that the tall oil released upon the acidification of such refined tall oil soap may have enhanced utility in the production of esters, alkyd resins, etc.

It is a further object of this invention to provide a method for the preparation of a tall oil soap solution which, when extracted with a water-immiscible solvent such as ether or hexane, shows less tendency towards emulsification than a tall oil soap solution which has not been so prepared.

It is also an object of this invention to provide a method for the refining of a tall oil soap, in which method the sodium salt of lignoceric acid may be recovered in a concentrated form which may be easily worked-up to produce pure lignoceric acid.

The aforementioned and other objects are accomplished in accordance with the method of this invention by admixing water or certain alcohols with an aqueous solution of a tall oil soap containing at least about 40% by weight of solids until said solution contains from about 0.5 to about 25% by weight of solids, and thereafter separating from the mixture the precipitated color bodies and sodium lignocerate.

The example which follows illustrates one specific embodiment of the method of the present invention, and is to be considered not limitative thereof.

*Example*

1000 gms. of a crude aqueous tall oil soap containing approximately 65% by weight of solids was diluted with stirring at about room temperature with 1500 gms. of water. After the solution had been permitted to stand for about one hour, a precipitate had accumulated and this precipitate was removed by filtering the mass through a filter containing a filter cell matting. The tall oil produced by the acidification of the filtered material was lighter in color than that produced by the acidification of the concentrated crude tall oil soap, due to the substantial removal of color bodies from the former.

The precipitate was washed with water, and then suspended in acetic acid to which several drops of concentrated hydrochloric acid had been added. The solution was filtered hot, and water was thereafter added until the solution became cloudy. On cooling, there precipitated a gummy mass, which was recrystallized from solution in acetone. The recrystallized material was water-white, substantially pure lignoceric acid which melted within the range 80–85° C. The amount of substantially pure lignoceric acid thus obtained amounted to 1.4% of the total solids in the crude tall oil soap treated.

The foregoing example illustrates the method of this invention for the removal of the sodium salt of lignoceric acid and color bodies from an aquous tall oil soap solution. Although a crude aqueous tall oil soap was employed in the example, the method of this invention may also be employed in removing the sodium salt of lignoceric acid and color bodies from any other tall oil soap (i. e., sodium salt) containing such materials. Furthermore, the aqueous tall oil soap solution should preferably contain from about 60 to about 70% by weight of total solids in order that the refining may be effected most economically. However, solutions containing upwards of 70% by weight of total solids may also be refined in accordance with the foregoing method, the upper limit of concentration of the tall oil soap in the aqueous solution refined being determined by the ease of handling such solution as a liquid. Moreover, in order that the refining may be effected most economically, it is desirable that the aqueous tall oil soap solution be refined by diluting it until it contains from about 20 to about 30% by weight of total solids.

In the example, the sodium lignocerate and color bodies were precipitated by admixing the aqueous tall oil soap solution with water. However, in place of water there may be substituted in accordance with the method of the present invention any saturated aliphatic monohydric alcohol containing from one to five carbon atoms (e. g., methanol, ethanol, isopropanol, n-butanol, tert.-butanol, n-amyl alcohol, etc.), or the monoalkyl ethers of monoethylene and diethylene glycol having from one to five carbon atoms in the alkyl radical (e. g., the monomethyl ether of monoethylene glycol, the monoethyl ether of monoethylene glycol, the mono-n-butyl ether of monoethylene glycol, the monomethyl ether of diethylene glycol, the monoethyl ether of diethylene glycol, etc.), or mixtures thereof. After the admixture of the aqueous tall oil soap solution and the water or alcohol, a period of time (generally at least one-half hour) should preferably be permitted to elapse, in order to effect as complete as possible a separation of the precipitated materials, which may then be separated from the remainder of the mixture by conventional procedures, such as filtration, centrifuging, etc.

The diluted aqueous tall oil soap solution produced in accordance with the foregoing method may, after having been filtered, centrifuged, etc., be advantageously treated in accordance with known methods to effect a further refining thereof. Thus, to the diluted solution there may be added from about 5 to about 25% of filtering aid (e. g., fuller's earth, diatomaceous earth, activated clay, etc.), based upon the weight of total solids in the solution. The mixture should then be stirred for about 10-30 minutes, and then filtered to obtain a clear soap solution and a filter cake. Such filtered soap solution should thereafter be extracted with a water-immiscible solvent (e. g., ether, hexane, mineral spirits, benzene, toluene, the xylenes, etc.), using a continuous or batch process, to effect a removal of the non-saponifiable components from the tall oil soap. The extracted aqueous tall oil soap layer should then be heated to expel therefrom any dissolved solvent, cooled, and then acidified to yield a tall oil of enhanced utility for the production of esters and alkyd resins. The diluted tall oil soap solution produced in accordance with the method of this invention is advantageously employed in such a process, since it gives rise to little or no difficulty from the standpoint of emulsion formation.

As the example illustrates, the method described herein is advantageous also in that it directly results in the production in a relatively concentrated form of the sodium salt of lignoceric acid. One method for the recovery of such acid has been described in the example. Alternatively, to effect a recovery of the lignoceric acid, the filter cake obtained in the filtration of the diluted aqueous tall oil soap solution, which filter cake contains the filtering aid, color bodies and sodium lignocerate, may be dispersed in water and covered with a water-immiscible solvent (e. g., ether, hexane, mineral spirits, benzene, toluene, the xylenes, etc.). The mixture should then be acidified with a suitable acid (e. g., sulfuric acid, hydrochloric acid, etc.), and after the mixture has been permitted to stand for a period of time the solvent layer containing the released lignoceric acid should be separated. Distillation of the solvent results in a precipitation of the lignoceric acid, which may be further purified by recrystallization from solution in a wide variety of solvents (e. g., acetone, hexane, benzene, ethyl alcohol, ethyl acetate, etc.).

Furthermore, instead of using an acetic acid-hydrochloric acid mixture to isolate the crude lignoceric acid as was done in the example, it has been found to be equally advantageous to disperse the filter cake in hot water, and then add a dilute mineral acid, such as dilute sulfuric acid or dilute hydrochloric acid, until the pH of the mixture is between about 4 and about 6. Upon heating the mixture to boiling and permitting it to stand and cool, the mixture separates into three layers, viz., a bottom solid layer, a lower aqueous layer, and an upper liquid layer containing crude lignoceric acid, which solidifies on cooling and is easily removed by skimming. This crude lignoceric acid may be further refined by recrystallization from solution in one of the solvents aforementioned as suitable for that purpose. In any event, the lignoceric acid when purified is a valuable composition of matter in that it may be esterified in accordance with known procedures with lower alcohols (e. g., methanol, ethanol, n-propanol, etc.) to produce esters which are suitable plasticizers, or with higher alcohols (e. g., lauryl alcohol, tetradecyl alcohol, cetyl alcohol, etc.) to produce synthetic waxes of the beeswax or carnauba wax type.

The method described herein for the refining of an aqueous tall oil soap solution is advantageous in that it results in the production of two products having greater utility than the tall oil soap treated. Thus, the tall oil released upon the acidification of the refined tall oil soap has increased utility in the production of esters and alkyd resins of greater drying speed. Furthermore, the dilute aqueous tall oil soap solution exhibits less tendency towards emulsification than the untreated tall oil soap solution when extracted with a water-immiscible solvent. In addition, the precipitate formed as a result of the practice of the method described herein may be easily further processed, to yield valuable plasticizers and wax substitutes.

I claim:

1. The method for the refining of an aqueous tall oil soap solution containing at least about 40% by weight of solids which comprises admixing with said solution until it contains from about 0.5 to about 25% by weight of solids a treating agent which consists essentially of at least one material selected from the group consisting of water, saturated aliphatic monohydric alcohols having from one to five carbon atoms and monoalkyl ethers of monoethylene glycol and diethylene glycol having from one to four carbon atoms in the alkyl radical, and thereafter permitting the mixture to settle for a period of time sufficient to effect a separation of the color bodies and sodium lignocerate.

2. The method for the refining of a crude aqueous tall oil soap solution containing at least about 40% by weight of solids which comprises admixing with said solution until it contains from about 0.5 to about 25% by weight of solids a treating agent which consists essentially of at least one material selected from the group consisting of water, saturated aliphatic monohydric alcohols having from one to five carbon atoms and monoalkyl ethers of monoethylene glycol and diethylene glycol having from one to four carbon atoms in the alkyl radical, and thereafter permitting the mixture to settle for a period of time sufficient to effect a separation of the color bodies and sodium lignocerate.

3. The method for the refining of a crude aqueous tall oil soap solution containing at least about 40% by weight of solids which comprises admixing with said solution until it contains from about 0.5 to about 25% by weight of solids a treating agent which consists essentially of at least one material selected from the group consisting of water, saturated aliphatic monohydric alcohols having from one to five carbon atoms and monoalkyl ethers of monoethylene glycol and diethylene glycol having from one to four carbon atoms in the alkyl radical, and thereafter permitting the mixture to settle for a period of at least one-half hour to effect a separation of the color bodies and sodium lignocerate.

4. The method for the refining of an aqueous tall oil soap solution containing at least about 40% by weight of solids which comprises admixing said solution with a treating agent which consists essentially of water until it contains from about 0.5 to about 25% by weight of solids, and thereafter permitting the mixture to settle for a period of time sufficient to effect a separation of the color bodies and sodium lignocerate.

5. The method for the refining of an aqueous tall oil soap solution containing at least about 40% by weight of solids which comprises admixing said solution with a treating agent which consists essentially of water until it contains from about 0.5 to about 25% by weight of solids, permitting the mixture to settle for a period of time sufficient to effect a separation of the color bodies and sodium lignocerate, separating the precipitated color bodies and sodium lignocerate from the tall oil soap solution, and thereafter contacting the solution with a filtering aid.

6. The method for the refining of an aqueous tall oil soap solution containing at least about 40% by weight of solids which comprises admixing said solution with a treating agent which consists essentially of methanol until it contains from about 0.5 to about 25% by weight of solids, and thereafter permitting the mixture to settle for a period of time sufficient to effect a separation of the color bodies and sodium lignocerate.

7. The method for the refining of an aqueous tall oil soap solution containing at least about 40% by weight of solids which comprises admixing said solution with a treating agent which consists essentially of methanol until it contains from about 0.5 to about 25% by weight of solids, permitting the mixture to settle for a period of time sufficient to effect a separation of the color bodies and sodium lignocerate, separating the precipitated color bodies and sodium lignocerate from the tall oil soap solution, and thereafter contacting the solution with a filtering aid.

8. The method for the refining of an aqueous tall oil soap solution containing at least about 40% by weight of solids which comprises admixing with said solution until it contains from about 0.5 to about 25% by weight of solids a treating agent which consists essentially of at least one material selected from the group consisting of water, saturated aliphatic monohydric alcohols having from one to five carbon atoms and monoalkyl ethers of monoethylene glycol and diethylene glycol having from one to four carbon atoms in the alkyl radical, and thereafter separating from the mixture the precipitated color bodies and sodium lignocerate.

TORSTEN HASSELSTROM.

REFERENCES CITED

The following references are of record in the file of this patent:

UNITED STATES PATENTS

| Number | Name | Date |
| --- | --- | --- |
| 2,248,978 | Francisco | July 15, 1941 |
| 2,324,012 | Mitchell | July 13, 1943 |

OTHER REFERENCES

Chemical Abstract, vol. 26, pages 472–473 citing Sandquist et al., Berichte 64 B., 2172–2174 (1931).